A. F. THOMPSON.
GAS BURNER.
APPLICATION FILED FEB. 10, 1912.
1,026,476.
Patented May 14, 1912.
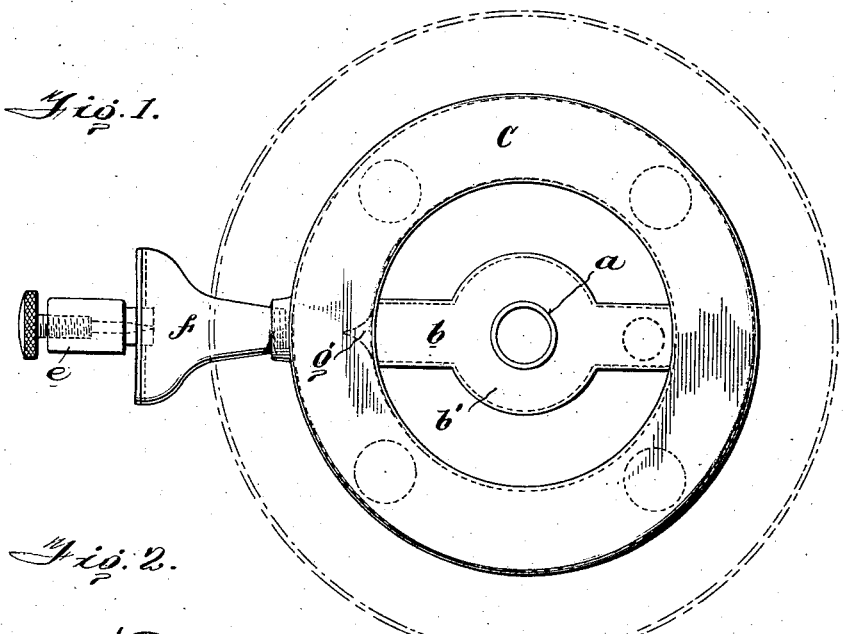
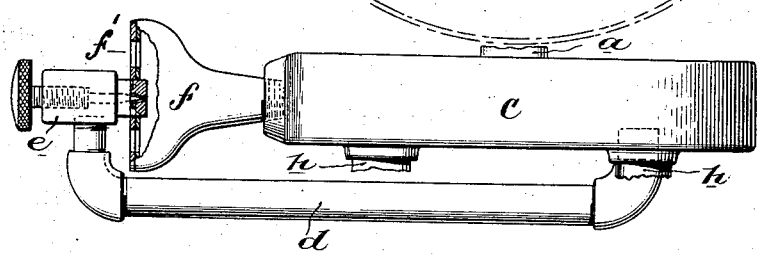
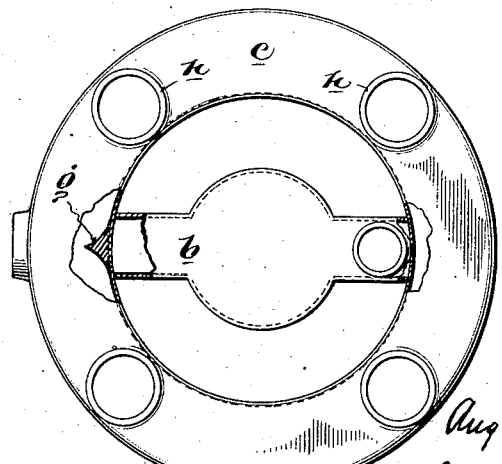
Witnesses
Inventor
Augustus F. Thompson
By Davis & Davis
Attorneys

UNITED STATES PATENT OFFICE.

AUGUSTUS F. THOMPSON, OF HUNTINGTON, WEST VIRGINIA.

GAS-BURNER.

1,026,476.

Specification of Letters Patent.

Patented May 14, 1912.

Application filed February 10, 1912. Serial No. 676,723.

*To all whom it may concern:*

Be it known that I, AUGUSTUS F. THOMPSON, a citizen of the United States, and a resident of Huntington, county of Cabell, State of West Virginia, have invented certain new and useful Improvements in Gas-Burners, of which the following is a full and clear specification, reference being had to the accompanying drawings, in which—

Figure 1 is a plan view of the burner, with the casing shown in dotted lines; Fig. 2 is a side elevation of the burner, the depending mantle or burner tubes being broken off; and Fig. 3 a bottom view of the burner with the mixer pipe and mixer removed.

The object of this invention is to improve that type of burner in which the gas is mixed with air prior to its issuance at the burner, the special object being to provide means for heating the gas before it is mixed with the air in the mixer and distributing chambers, the heat from the lights themselves being utilized for this purpose, whereby the highest efficiency is obtained, as more fully hereinafter set forth.

The gas is supplied through the pendant pipe $a$ centrally located, the lower end of this pipe discharging into a horizontal chamber $b$ which extends across centrally a ring-like chamber $c$ but does not communicate directly with said chamber. The portion of the chamber $b$ located at the center of the ring $c$ is enlarged laterally, this enlargement being indicated by the reference character $b'$. The chamber $b$, $b'$ is practically inclosed within the annular chamber $c$ and by preference these two chambers are cast integrally, the inner wall of the ring chamber serving to close the opposite ends of the chamber $b$.

At one end of the chamber $b$ its lower wall is provided with a discharge opening and connected to this opening is a pipe $d$ which extends horizontally underneath the chamber $c$ to a point beyond the opposite side of the chamber $c$. This outer end of the pipe $d$ is extended upwardly and provided with a needle valve $e$ of the usual form. The nozzle of this valve is directed inwardly toward the chamber $c$ and extends into the outer flared end of the mixing nozzle $f$, whose outer end is provided with the usual air inlet openings $f'$. The inner contracted end of this mixing nozzle $f$ is screwed into the adjacent outer wall of the annular chamber $c$. Opposite the entrance point of the mixer $f$ the inner annular wall of the chamber $c$ is provided with a tapering deflector $g$ which is directed toward the center of the mixing chamber. Depending from the chamber $c$ is a series of tubes $h$ to which the mantles (not shown) are affixed in any of the usual or improved ways.

It will be observed that the fresh gas passes down through chamber $b$, thence across through pipe $d$ and thence into the mixing tube $f$. From this tube or nozzle $f$ the mixed air and gas is injected into the annular chamber $c$. The oppositely inclined deflector $g$ divides the incoming stream and causes it to travel around the ring chamber $c$ in opposite directions. In this manner the air and gas are thoroughly mixed before they pass down through the burner tubes $h$. It will be observed that with this arrangement, the fresh gas will be preliminarily passed through a chamber ($b$, $b'$) and a tube ($d$) which lie directly in the hottest zone of the burners and will thus be brought to a high temperature before being injected into the mixing chamber; I have found in practice that this pre-heating of the live gas materially promotes thorough mixing of the air and gas and in consequence the thorough combustion at the burners. A feature of importance lies in accomplishing this high pre-heating of the gas by means of the waste heat of the lights themselves.

It will be understood that my invention is not confined to the specific construction shown and described since this construction can be greatly varied without departing from the spirit of the invention.

It will be observed that the fresh gas receiving chamber $b$, $b'$ must be something more than a mere supply conduit for the gas; it must be in fact a chamber of sufficient capacity to cause a sufficient slowing up of the flow of gas to enable the gas to be thoroughly heated and expanded before it is applied to the injector of the mixer. It will be observed further that this pre-heating chamber must be located above the lights in such position that the rising products of combustion shall strike against and pass up around the sides of the chamber in order that the desired heat may be extracted from the hot products of combustion before the heat is dissipated into the atmosphere.

It will be observed that in my apparatus the gas is highly heated and then mixed with the air, and then the mixture itself is pre-heated. In this way the highly heated gas is utilized to raise the temperature of the air as it passes into the mixing chamber, whereby the heating of the mixture will be already well advanced at the time it enters the mixing chamber so that the comparatively short space of time that it remains in the mixing chamber before issuing at the burner tips or mantles will be ample to raise the temperature of the mixture to the high temperature that is desirable.

Having thus described my invention, what I claim as new and desire to secure by Letters Patent, is—

1. In a gas burning fixture of the type set forth, a gas receiving chamber, a mixing chamber, means connecting these two chambers embodying air intake means, a burner tube connected with the mixing chamber, said two chambers being disposed in the same horizontal plane when the fixture is in operative position and in the direct path of the ascending products of combustion, for the purpose set forth.

2. In a burner of the type set forth, a gas supply pipe, a gas heating and expanding chamber connected thereto, a mixing and distributing chamber surrounding the aforesaid chamber and provided with depending burner tubes, and means for discharging the gas from the receiving chamber into the mixing chamber and drawing in with it a quantity of air.

3. In a burner of the type set forth, a gas receiving chamber, a mixing chamber surrounding said gas receiving chamber and lying in the same horizontal plane therewith, the two chambers being structurally connected, and conduit means for conveying gas from the gas chamber into the mixing chamber, said means embodying air intake devices, said mixing chamber being provided with depending burner tubes and both said chambers lying in the path of the ascending products of combustion of the burners.

4. In a burner of the type set forth, a horizontal gas receiving chamber, a horizontal mixing chamber surrounding the same and carrying burner tubes, both chambers lying in the path of the ascending products of combustion from the burner tubes, said mixing chamber being provided with a depending burner tube, an air injector connected to one side of the mixing chamber, and a gas pipe connecting the gas chamber to said air injector, said gas pipe and both said chambers lying in the path of the ascending products of combustion from the burners.

In testimony whereof I hereunto affix my signature in the presence of two witnesses.

AUGUSTUS F. THOMPSON.

Witnesses:
T. F. EAKMAN,
JOHN F. ELLIS.

---

Copies of this patent may be obtained for five cents each, by addressing the "Commissioner of Patents, Washington, D. C."